United States Patent
Vierk et al.

(10) Patent No.: US 6,764,734 B2
(45) Date of Patent: Jul. 20, 2004

(54) HIGH MODULUS AND HIGH DAMPING PLASTIC COMPOSITE DISC SUBSTRATE FOR IMPROVED SERVO CONTROL BY INJECTION AND CO-INJECTION MOLDING

(75) Inventors: Stanley Dale Vierk, Pleasanton, CA (US); Hong Ying Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/314,262

(22) Filed: May 18, 1999

(65) Prior Publication Data

US 2003/0198834 A1 Oct. 23, 2003

Related U.S. Application Data

(60) Provisional application No. 60/086,360, filed on May 19, 1998.

(51) Int. Cl.⁷ .................................................. G11B 5/82
(52) U.S. Cl. .................... 428/64.1; 428/64.2; 428/64.3; 428/65.3; 428/297.4; 428/328; 428/330; 428/331; 428/694 SL; 360/135; 360/97.01
(58) Field of Search .......................... 428/64.1, 64.2, 428/64.3, 65.3, 297.4, 328, 330, 331, 694 SL; 360/135, 97.01

(56) References Cited

U.S. PATENT DOCUMENTS

| | | | | |
|---|---|---|---|---|
| 4,622,261 A | * | 11/1986 | Ochiai | 428/195.1 |
| 4,680,211 A | * | 7/1987 | Evans et al. | 428/65 |
| 4,726,007 A | * | 2/1988 | McCormack | 369/286 |
| 5,043,369 A | | 8/1991 | Bahn et al. | 523/466 |
| 5,458,940 A | * | 10/1995 | Woo | 428/64.3 |
| 5,585,989 A | * | 12/1996 | Kuromiya et al. | 360/135 |
| 5,725,931 A | * | 3/1998 | Landin et al. | 428/134 |
| 5,981,015 A | * | 11/1999 | Zou et al. | 428/64.2 |
| 6,069,219 A | * | 5/2000 | McCormick et al. | 526/329.7 |
| RE36,806 E | * | 8/2000 | Landin et al. | 428/64.1 |
| 6,154,442 A | * | 11/2000 | Kondo et al. | 369/286 |

FOREIGN PATENT DOCUMENTS

| | | | |
|---|---|---|---|
| EP | 0 227 981 | * | 7/1987 |
| GB | 1 214 340 | * | 12/1970 |
| JP | 02-298553 | * | 12/1990 |
| JP | 03227355 | * | 10/1991 |
| JP | 05-182241 | * | 7/1993 |
| JP | 07-188543 | * | 7/1995 |
| JP | 08-073676 | * | 3/1996 |

* cited by examiner

Primary Examiner—Stevan A. Resan
(74) Attorney, Agent, or Firm—Moser Patterson & Sheridan LLP

(57) ABSTRACT

A substrate for use in a data storage system is disclosed. The substrate includes at least one core layer comprising at least one plastic or plastic composite material exhibiting a modulus of about 350 kpsi or greater, and damping agents, reinforcing agents, or combinations thereof. The damping agents, reinforcing agents, or combinations thereof, are substantially uniformly distributed within the plastic or plastic composite material. Optionally, one or more skin layers are disposed adjacent the at least one core layer.

51 Claims, 2 Drawing Sheets

HIGH MODULUS AND HIGH DAMPING PLASTIC COMPOSITE DISC SUBSTRATE FOR IMPROVED SERVO CONTROL BY INJECTION AND CO-INJECTION MOLDING

RELATED APPLICATIONS

This application claims priority from provisional patent application Serial No. 60/086,360 filed May 19, 1998, and the entire disclosure of the provisional patent application is hereby incorporated herein by reference.

FIELD OF THE INVENTION

The field of this invention is data storage systems. More particularly, the invention pertains to plastic and plastic composite substrates used as discs in magneto-optical (MO) and magnetic recording (MR) data storage systems.

BACKGROUND OF THE INVENTION

With the advance of magneto-optical and magnetic recording technologies, the design of the discs, and particularly the substrates, in such data storage systems have been the subject of great interest. One area of interest is the development of discs that can store increased densities of data. This can be achieved by formatting the disc with a particular pattern which provides for servo control. Formatting is done by forming a pattern of pits or grooves in the surface of the disk or substrate.

To provide formatting requires the use of a plastic substrate. Conventional hard discs, such as those used with MR systems, are made of aluminum or glass. Conventional CD's do use polycarbonate plastic substrates; however, such applications are limited to low density storage, and to low rotation speeds of only a few thousand rpm. Further, such polycarbonate substrates are not suitable for use with a "flying" recording head as used with MR and MO data storage systems, because of its low modulus and low damping properties giving poor shock and vibration performance.

The inventors have found that when substrates made from polycarbonate, or other materials such as amorphous polyolefin that have similar physical and mechanical properties to polycarbonate, are used in a MR or MO disk drive applications the substrate is prone to failure causing the disk drive to fail. The MR and MO disk drive applications typically employ rotation speeds of greater than 5000 rmp and utilize flying recording heads, and when using conventional polycarbonate and similar substrates, the head to disk tracking becomes very difficult for the servo system to accommodate due to axial and radial disk vibrations.

Thus, the currently available plastic substrates are unsatisfactory for MR and MO applications. Accordingly, it is desirable to provide a data storage system which addresses the aforementioned limitations, and in particular to provide a disk or substrate which is capable of formatting for high density data storage and is operable at high rotational speeds with flying heads.

SUMMARY OF THE INVENTION

Accordingly, it is an object of the present invention to provide an improved storage system or recording device.

More particularly, it is an object of the present invention to provide a plastic or plastic composite substrate that is used as a disk in MO or MR data storage systems.

These and other objects and advantages are achieved by the present invention disclosed herein where a data storage system substrate is provided, comprising at least one plastic material. The plastic material has mechanical strength and rigidity, and in particular it exhibits a modulus of about 350 kpsi or greater. In another aspect of the invention, the plastic material includes a damping agent for damping shock and/or vibration forces that the disk may be subject to during its operation. In another aspect of the invention a data storage system is provided having means for reading and writing information to a storage disk, and means for storing said information in said storage disk, wherein said storage disk is comprised of at least one plastic or plastic composite material, and the plastic or plastic composite material exhibits a modulus of about 350 kpsi or greater.

In another aspect of the invention, an apparatus is provided comprising a disk drive spindle motor; and at least one data storage disk mounted on the disk drive spindle having means for exhibiting a modulus of about 350 kpsi or greater. Further the apparatus includes means for strengthening and/or damping energy that the apparatus is subjected to.

BRIEF DESCRIPTION OF THE DRAWINGS

Additional objects and features of the invention will become more clearly apparent from the following detailed description and appended claims when taken in conjunction with the drawings, in which:

DETAILED DESCRIPTION OF THE INVENTION

Figure 1:
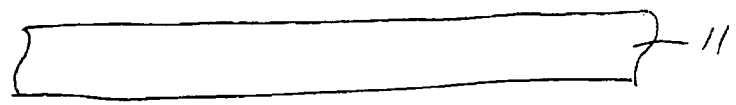
FIG. 1 is a cross-sectional view of a data storage system substrate, in accordance with one embodiment of the present invention.

The inventors have discovered an improved data storage system substrate design that provides for the use of a plastic or plastic composite substrate that is suitable for formatting of servo control patterns, but that exhibits improved shock and vibration performance, making the inventive substrates suitable for magnetic recording (MR) and magneto-optical (MO) data storage applications which operate at high rotational speeds and employ flying heads.

Of particular advantage, the present invention provides a plastic, or plastic composite, substrate that is comprised at least in part of a high modulus material 11 as shown in FIG. a. Plastic materials or plastic composites finding use in the present invention are materials having a modulus of greater than 350 kpsi, more preferably having a modulus in the range of about 400 to 3,000 kpsi, with a modulus higher than 1,000 kpsi being most preferred. Optionally, the substrate composition may be formed by combining polymer resins or resin blends with certain fillers and other additives to form a high modulus plastic composite. The fillers may be classified into two groups, i.e. reinforcing agents and damping agents. The reinforcing agents increase the modulus of rigidity of the substrate. Examples of reinforcing agents include anisotropic fillers such as glass fibers, carbon fibers and the like, and isotropic fillers such as mineral particles and the like. The damping agent increases the damping ability of the substrate. Examples of damping agents include elastomeric particles and the like. Examples of high modulus plastic materials includes, but are not limited to: amorphous polysulfone (PSU), amorphous polyethersulfone (PES), amorphous polyetherimide (PEI), semi-crystalline polyphenylsulfide (PPS), semi-crystalline polyphthalamide (PPA), liquid crystal polymer (LCP), polyetheretherketone (PEEK), and other plastic materials that have a rigid backbone with bulky groups like an aromatic ring in the backbone. Additionally, polycarbonate (PC)may be used as a skin material in combination with a core material (described further below). Further filled polycarbonate may be used as a core material. Chemical properties, and certain molding conditions, of certain of the materials are shown in Table 1 below and are compared against conventional polycarbonate (PC):

TABLE 1

| Name | PC | PSU | PES | PEI | PPS | PPA (filled) | LCP (filled) |
| --- | --- | --- | --- | --- | --- | --- | --- |
| modulus (kpsi) | 300 | 380 | 420 | 480 | 550 | 1,100 | 2,280 |
| Density (g/cm3) | 1.20 | 1.24 | 1.37 | 1.27 | 1.40 | 1.54 | 1.70 |
| Specific Heat (J/kgK) | 1,750 | 1,675 | 1,150 | 2,036 | 2,080 | 1,262 | — |
| Tg(° C.) | 150 | 190 | 220 | 217 | 85 | 127 | — |
| Tm(° C.) | — | — | — | — | 280 | 310 | 340 |
| Melt T (set) (° C.) | 345 | 350 | 385 | 385 | 345 | 340 | 340 |
| Mold T (° C.) | 100 | 140 | 150 | 140 | 140 | 150 | 135 |
| heat removed on cooling (j/g) | 429 | 352 | 270 | 499 | 426 | 240 | — |
| thermal conductivity (W/mk) | 0.20 | 0.16 | 0.16 | 0.22 | 0.29 | 0.40 | — |
| cooling time used (sec) | <7 | 25 | 25 | 15 | 30 | 35 | 15 |
| water absorption (%) | 0.15 | 0.20 | 0.54 | 0.25 | 0.03 | 0.14 | <0.1 |

The above listed plastic and plastic composites are typically classified as engineering plastics and are commercially available from a variety of suppliers, such as Amoco, Philip 66, General Electric and the like.

In another aspect of the invention, a plastic or plastic composite substrate is provided that includes a damping agent. The damping agent may be any material that absorbs energy as opposed to transmitting energy. For example, in one embodiment of the present invention, a filler material is used as a damping agent. The filler material may be added to the plastic or plastic composite. Thus, the plastic or plastic composite substrate of the present invention may be filled or unfilled. Filler materials include, but are not limited to: glass fibers, carbon fibers, mineral particles, and other damping particles.

When providing a plastic or plastic composite substrate according to the present invention, it is preferred that the concentration of the fillers in the substrate be in the range of about 5 to 65 weight percent. The particular concentration of filling agent selected is determined by the type of agent used and the plastic or plastic composite material used. Preferably, the concentration is towards to high end of the range, which will provide the greatest mechanical and damping capability; however, if the concentration is too high, the surface flatness and/or smoothness of the substrate will deteriorate. Further, manufacturing of the substrate may become less feasible. Thus, the size and type of the filler agent is influences by the fabrication technique used and/or the application. For example, when the substrate is comprised of a single layer, it is preferred that the filler particles be as small as practical. Alternatively, when the substrate includes a core layer, the size of the particles in the core layer are not important so long as they provide the desired mechanical and damping performance, and is processible.

Accordingly, any of the above mentioned high modulus plastic and plastic composite materials may be filled with the aforementioned damping agents to provide a plastic substrate which exhibits desirable mechanical properties of strength and damping of vibration and shock forces. Such characteristics make the plastic substrate of the present invention suitable for MR and MO data storage systems, and of particular advantage for such systems that operate at rotational speeds of greater than 5000 rpm and which utilize flying heads.

Figure 2:
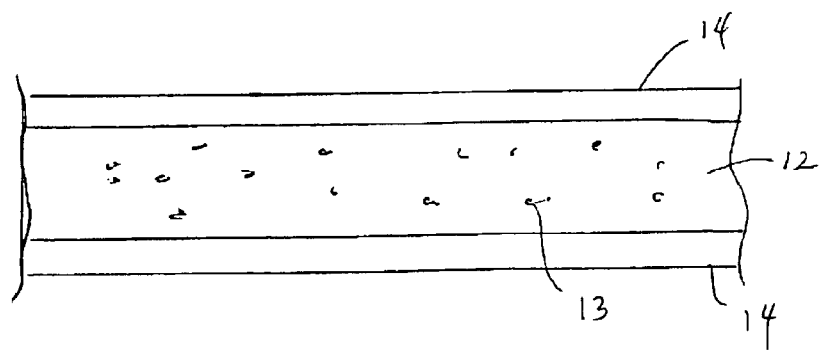
FIG. 2 is a cross-sectional view of a data storage system substrate, in accordance with an alternative embodiment of the present invention.
Figure 3:
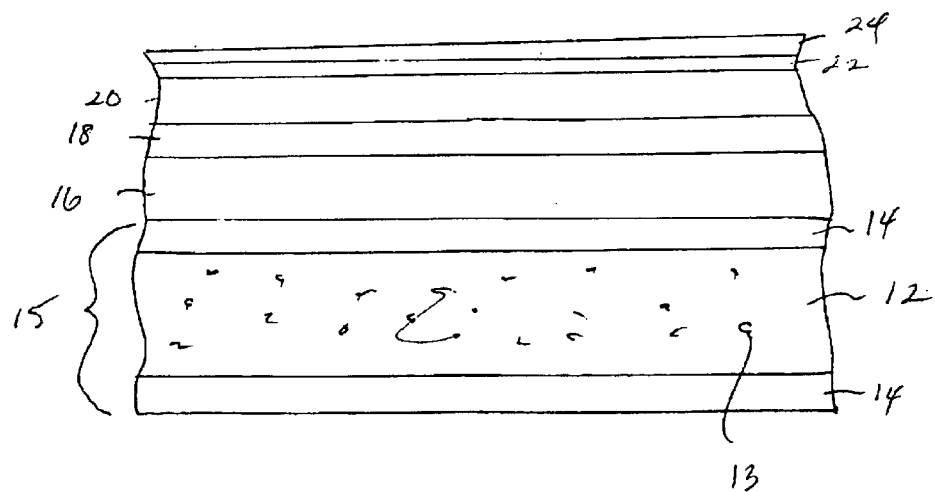
FIG. 3 is a cross-sectional view of a data storage system disk, in accordance with an alternative embodiment of the present invention.

In another embodiment of the invention, a multi-layer plastic or plastic composite substrate is provided. In particular, the substrate is comprised of two or more layers of plastic or plastic composite materials as shown in FIGS. 2 and 3. Specifically, as shown in one illustrative example of FIG. 2, the substrate 5 is comprised of multiple plastic material layers, in this case three layers. A middle, or core layer 12 is sandwiched between two outer, or skin layers 14. The core layer 12 may be filled with an agent 13, such as a reinforcing agent of mineral particles, glass or carbon fibers; or a damping agent such as elastomeric particles and the like to provide desirable mechanical and/or damping properties. Alternatively, the core layer 12 may be unfilled. Preferably, the skin layers 14 is unfilled in order to provide a smooth surface finish to the substrate 14. While three layers are shown in FIG. 2, it should be understood that any number of layers may be used, such as more than three, or even only two layers in which case one of the skin layers 14 would be omitted and the core layer 12 would no longer be sandwiched between two skin layers. Additionally, the core layer 12 may be made up of multiple sub layers, for example where each sub layer is made up of layers of different plastic materials and/or with differing damping agents.

The substrate shown in FIG. 2 is particularly advantageous for providing a substrate with desirable mechanical and damping characteristic due to the core filled layer 12, while maintaining a smooth and flat surface due to the unfilled skin layers 14. Further, any one of, or any combination of the core and skin layers may be comprised of a high modulus material, thereby adding strength to the substrate. In yet another embodiment of the present invention, the core layer 12 is comprised of a filled high modulus plastic material, thereby providing the desirable strength and damping capability to the substrate, and then one or more of the skin layers may be comprised of a conventional polycarbonate material.

The thickness of the layers 12 and 14 are not critical, and may be varied depending on the geometry of the disk drives. In general, the thicker the substrate the more rigidity, better performance and ease of processing, and this is preferred if the drive design will accommodate the thicker substrate. The inventors have found however, that to provide the greatest strength and damping qualities, It is preferred for the core layer 12 to have a greater thickness than the skin layer 14. However, this is not a requirement and the core layer 12 can be of the same thickness as, or a lesser thickness of, the skin layer 14. In the preferred embodiment, the substrate 5 has three layers, one core layer and two skin layers, and the core layer is comprised of polyetherimide filled with mineral particles, and the skin layers are comprised of pure polyetherimide.

In another aspect of the present invention, a disk 10 is provided as illustrated in FIG. 3. The disk 10 includes the plastic substrate 15 of the present invention as described above, and multiple layers formed atop the plastic substrate 15. FIG. 3 shows these multiple layers formed atop only one side of the substrate (i.e. a one sided disk); however, these multiple layers may also be formed atop the other side of the substrate (i.e. a doubled sided disk). In the exemplary embodiment, the substrate 15 is comprised of a core layer 12 filled with a damping agent 13 sandwiched between two skin layers 14. The multiple layers are formed atop skin layer 14 and include an aluminum layer 16. Formed atop the aluminum layer 16 is a magnetic layer 18, and then a protective layer 20. To provide good tribological properties, a carbon overcoat layer 22 is formed atop the protective layer 20 and a lubrication layer 24 is applied atop the overcoat layer 22. Of particular advantage, the plastic substrate may be formatted with a pattern for enhanced servo control, and yet the substrate exhibits desirable mechanical properties such that the disk 10 is suitable for use in MR and MO data storage systems, and in particular those systems which operate at rotation speeds of greater than 5000 rpm and employ flying heads. Thus, in another aspect of the present invention a data storage system is provide having the disk of the present invention and further including a read/write head, an actuator for moving the read/write head and a motor from rotating the disk (not shown).

Figure 4:
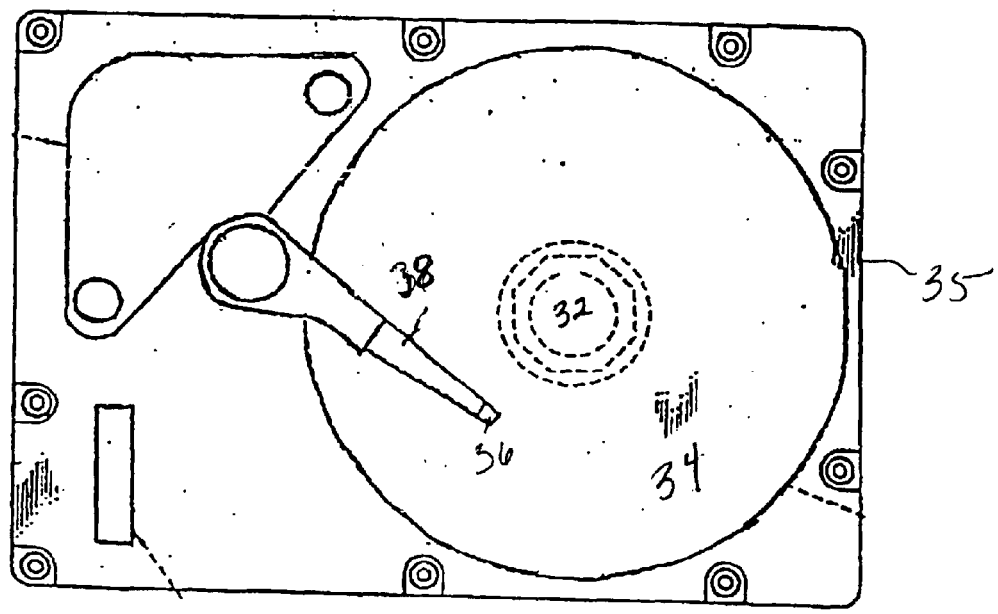
FIG. 4 is a cross-sectional view of an apparatus of the present invention.

In another aspect of the invention, an apparatus 30 is provided including a disk drive spindle motor 32 and at least one data storage disk 34 mounted on the disk drive spindle 32 as shown in FIG. 4. The apparatus further includes a housing 35, a read/write head 36 and an actuator assembly 37 and actuator arm 38 for positioning the read/write head 36. The data storage disk 34 has means for exhibiting a modulus of about 350 kpsi or greater. Further the apparatus includes means for strengthening and/or damping energy that the apparatus is subjected to.

The plastic substrate and disk of the present invention may be made by conventional methods. The substrates may be made by plastic injection molding techniques, and by co-injection molding techniques. Co-injection molding methods are particularly suitable for making the multilayered substrate embodiment of the present invention having the core material with one or more skins formed atop the core material.

Experimental

Plastic and plastic composite substrates and disks according to the present invention were prepared and tested. The following examples are offered by way of illustration and not by way of limitation.

Ten injection molded plastic substrates were prepared with a diameter of 130 mm and a thickness of 1.2 mm. The substrates were comprised of polyetherimde with a formatted surface. Disks were formed with the ten plastic substrates by sputtering atop the substrates a MO layer structure, having a carbon overcoat and a lubrication layer. The substrates were subjected to glide tests at 5 micron inches (125 nm) and showed a good average defect rate of only 0.80.

Additional experiments were conducted to prepare substrates formed of pure PEI in accordance with the present invention. Disks were prepared having a diameter of 130 mm and a thickness of 1.2 mm. The disks were singe side formatted. The substrates were formed by injection molding using a Technoplas SIM-4749A machine with cavity pressure control. The clamping force applied was 47 ton. The melt temperature was 380 C. and a mold temperature of 185 C. was used. The maximum injection pressure of the molding machine was about 30,000 psi with an injection rate of about 68 $cm^3$/sec. The substrates formed were very flat and exhibited a disk roughness of a few angstroms depending on the roughness of the stamper. The pit replication (formatting) was very good. These substrates were then prepared as disks having a quadric-layer and tri-layer MO structures, both with carbon overcoats and a lubricant. Glide tests were performed at 5 micron inches and the disks showed good average defect rates.

As has been described, an improved plastic substrate and disk has been provided. Of particular advantage the vibration characteristics of plastic disc substrates used in the manufacture of magnet optic and hard discs are significantly improved resulting in better head to disc servo control, by providing a high modulus plastic material, or by combining polymer resins or resin blends with certain isotropic fillers and other additives to form a high modulus plastic composite. The resultant plastic composite substrate have higher frequency and lower amplitude vibration properties when excited during impact or rotation in a disc drive application. The plastic composite substrate exhibit imported mechanical/physical properties which improve the vibration characteristics for better head/disc servo control. Further, in one variation of the invention, plastic substrates for use in magnet optic or hard discs are made by co-injection molding two or more plastic materials into a substrate mold cavity such that a substrate core is formed from a plastic with excellent damping properties and with a low roughness outer substrate surface formed from a plastic that replicates the servo pit pattern. When excited by impact or disc rotation the higher damping core material will dampen the vibration of the substrate in a disc drive application. Having a plastic substrate core with excellent vibration damping changes the vibration characteristics and makes the servo system more effective in head to disc tracking at higher rotations and higher densities.

Thus, an improve data storage system substrate and disk having a high modulus plastic material, and optionally additionally a damping agent, has been described. While the present invention has been described with reference to a few specific embodiments, the description is illustrative of the invention and is not to be construed as limiting the invention. Various modifications and changes may occur to those skilled in the art without departing from the true spirit and scope of the invention as defined by the appended claims.

What is claimed:

1. A substrate for use in a data storage system, comprising:
    at least one core layer comprising at least one plastic or plastic composite material exhibiting a modulus of about 350 kpsi or greater and damping agents, reinforcing agents, or combinations thereof, wherein the damping agents, reinforcing agents, or combinations thereof, are substantially uniformly distributed within the plastic or plastic composite material; and
    one or more skin layers disposed adjacent the at least one core layer, wherein the at least one core layer has a greater thickness than the one or more skin layers and the at least one plastic or plastic composite material comprises polyetherimide and mineral particles and the one or more skin layers comprise polyetherimide.

2. The substrate of claim 1, wherein the plastic or plastic composite material exhibits a modulus in the range of about 350 to about 3,000 kpsi.

3. The substrate of claim 1, wherein the reinforcing agents further comprise materials selected from the group consisting of carbon fibers, glass fibers, and combinations thereof.

4. The substrate of claim 1, wherein the damping agents, reinforcing agents, or combinations thereof in the plastic or plastic composite material have a concentration in the range of about 5 to about 65 weight %.

5. The substrate of claim 1, where the at least one core layer comprises one or more sublayers, wherein each sublayer comprises a different plastic or plastic composite material, different damping agents, different reinforcing agents, or combinations thereof, and at least one sub-layer comprises polyetherimide and mineral particles.

6. The substrate of claim 1, wherein said substrate is formatted with servo control patterns.

7. The substrate of claim 1, further comprising a disk comprising:
  a magneto-optical or magnetic recording layer structure disposed on the at least one core layer or one or more skin layers; and
  a carbon overcoat formed atop said magneto-optical or magnetic recording layer structure.

8. The substrate of claim 7, wherein the substrate is disposed in a data storage system comprising:
  a read/write head;
  an actuator for moving said read/write head; and
  a motor for rotating said disk.

9. A substrate for use in a data storage system, comprising:
  at least one core layer comprising at least one plastic or plastic composite material xhibiting a modulus of about 350 kpsi or greater and damping agents, reinforcing agents, or combinations thereof, wherein the damping agents, reinforcing agents, or combinations thereof, are substantially uniformly distributed within the plastic or plastic composite material; and
  one or more skin layers disposed adjacent the at least one core layer, wherein the at least one core layer has a greater thickness than the one or more skin layers and the one or more skin layers comprise a polycarbonate material.

10. The substrate of claim 9, wherein the plastic or plastic composite material exhibits a modulus in the range of about 350 to about 3,000 kpsi.

11. The substrate of claim 9, wherein the reinforcing agents further comprise materials selected from the group consisting of carbon fibers, glass fibers, and combinations thereof.

12. The substrate of claim 9, wherein the damping agents, reinforcing agents, or combinations thereof in the plastic or plastic composite material have a concentration in the range of about 5 to about 65 weight %.

13. The substrate of claim 9, where the at least one core layer comprises one or more sublayers, wherein each sublayer comprises a different plastic or plastic composite material, different damping agents, different reinforcing agents, or combinations thereof.

14. The substrate of claim 9, wherein said substrate is formatted with servo control patterns.

15. The substrate of claim 9, further comprising a disk comprising:
  a magneto-optical or magnetic recording layer structure disposed on the at least one core layer or one or more skin layers; and
  a carbon overcoat formed atop said magneto-optical or magnetic recording layer structure.

16. The substrate of claim 15, wherein the substrate is disposed in a data storage system comprising:
  a read/write head;
  an actuator for moving said read/write head; and
  a motor for rotating said disk.

17. The substrate of claim 9, wherein the plastic or plastic composite material is selected from the group consisting of polysulfone (PSU), polyethersulfone (PES), polyetherimide (PEI), polyphenylsulfide (PPS), polyphthalamide (PPA), liquid crystal polymer (LCP), polyethereth rketone (PEEK), polyearbonate (PCB) and combinations thereof.

18. A substrate for use in a data storage system, comprising:
  at least one core layer made of a plastic or plastic composite material having damping agents, reinforcing agents, or combinations thereof; and
  one or more skin layers made of a plastic or plastic composite material, and formed on at least one surface of the core layer, wherein at least one of the core or the one or more skin layers exhibits a modulus of 350 kpsi or greater, and wherein the at least one core layer has a greater thickness than the one or more skin layers and the at least one plastic or plastic composite material comprises polyetherimide and mineral particles and the one or more skin layers comprise polyetherimide.

19. The substrate of claim 18, wherein the plastic or plastic composite material exhibits a modulus in the range of about 350 to about 3,000 kpsi.

20. The substrate of claim 18, wherein the reinforcing agents further comprise materials selected from the group consisting of carbon fibers, glass fibers, and combinations thereof.

21. The substrate of claim 18, wherein the damping agents, reinforcing agents, or combinations thereof in the plastic or plastic composite material have a concentration in the range of about 5 to about 65 weight %.

22. The substrate of claim 18, where the at least one core layer comprises one or more sublayers, wherein each sublayer comprises a different plastic or plastic composite material, different damping agents, different reinforcing agents, or combinations thereof, and at least one sub-layer comprises polyetherimide and mineral particles.

23. The substrate of claim 18, wherein said substrate is formatted with servo control patterns.

24. The substrate of claim 18, further comprising a disk comprising:
  a magneto-optical or magnetic recording layer structure disposed on the at least one core layer or one or more skin layers; and
  a carbon overcoat formed atop said magneto-optical or magnetic recording layer structure.

25. The substrate of claim 24, wherein the substrate is disposed in a data storage system comprising:
  a read/write head;
  an actuator for moving said read/write head; and
  a motor for rotating said disk.

26. A substrate for use in a data storage system, comprising:
  at least one core layer made of a plastic or plastic composite material having damping agents, reinforcing agents, or combinations thereof; and
  one or more skin layers made of a plastic or plastic composite material, and formed on at least one surface of the core layer, wherein at least one of the core or the one or more skin layers exhibits a modulus of 350 kpsi or greater, and wherein the at least one core layer has a greater thickness than the one or more skin layers and the one or more skin layers comprise a polycarbonate material.

27. The substrate of claim 26, wherein the plastic or plastic composite material exhibits a modulus in the range of about 350 to about 3,000 kpsi.

28. The substrate of claim 26, wherein the reinforcing agents further comprise materials selected from the group consisting of carbon fibers, glass fibers, and combinations thereof.

29. The substrate of claim 26, wherein the damping agents, reinforcing agents, or combinations thereof in the plastic or plastic composite material have a concentration in the range of about 5 to about 65 weight %.

30. The substrate of claim 26, where the at least one core layer comprises one or more sublayers, wherein each sub-layer comprises a different plastic or plastic composite material, different damping agents, different reinforcing agents, or combinations thereof.

31. The substrate of claim 26, wherein said substrate is formatted with servo control patterns.

32. The substrate of claim 26, further comprising a disk comprising:
  a magneto-optical or magnetic recording layer structure disposed on the at least one core layer or one or more skin layers; and
  a carbon overcoat formed atop said magneto-optical or magnetic recording layer structure.

33. The substrate of claim 32, wherein the substrate is disposed in a data storage system comprising:
  a read/write head;
  an actuator for moving said read/write head; and
  a motor for rotating said disk.

34. The substrate of claim 26, wherein the plastic or plastic composite material is selected from the group consisting of polysulfone (PSU), polyethersulfone (PES), polyetherimide (PEI), polyphenylsulfide (PPS), polyphthalamide (PPA), liquid crystal polymer (LCP), polyetheretherketone (PEEK), polycarbonate (PCB) and combinations thereof.

35. An apparatus, comprising:
  a disk drive spindle motor; and
  at least one data storage disk mounted on said disk drive spindle motor wherein said storage disk comprises at least one core layer that is formed of a plastic or plastic composite material and damping agents, reinforcing agents, or combinations thereof, wherein the damping agents, reinforcing agents, or combinations thereof, are substantially uniformly distributed within the plastic or plastic composite material; and
  one or more skin layers disposed adjacent the at least on core layer, wherein the at least one core layer has a greater thickness than the one or more skin layers and the at least one plastic or plastic composite material comprises polyetherimide and mineral particles and the one or more skin layers comprise polyetherimide.

36. The substrate of claim 35, wherein the plastic or plastic composite material exhibits a modulus in the range of about 350 to about 3,000 kpsi.

37. The substrate of claim 35, wherein the reinforcing agents further comprise materials selected from the group consisting of carbon fibers, glass fibers, and combinations thereof.

38. The substrate of claim 35, wherein the damping agents, reinforcing agents, or combinations thereof in the plastic or plastic composite material have a concentration in the range of about 5 to 65 weight %.

39. The substrate of claim 35, where the at least one core layer comprises one or more sublayers, wherein each sub-layer comprises a different plastic or plastic composite material, different damping agents, different reinforcing agents, or combinations thereof, and at least one sub-layer comprises polyetherimide and mineral particles.

40. The substrate of claim 35, wherein said substrate is formatted with servo control patterns.

41. The substrate of claim 35, further comprising:
  a magnet-optical or magnetic recording layer structure disposed on the at least one core layer or one or more skin layers; and
  a carbon overcoat formed atop said magneto-optical or magnetic recording layer structure.

42. The substrate of claim 41, wherein the substrate is disposed in a data storage system comprising:
  a read/write head;
  an actuator for moving said read/write head; and
  a motor for rotating said disk.

43. An apparatus, comprising:
  a disk drive spindle motor; and
  at least one data storage disk mounted on said disk drive spindle motor wherein said storage disk comprises at least one core layer that is formed of a plastic or plastic composite material and damping agents, reinforcing agents, or combinations thereof, wherein the damping agents, reinforcing agents, or combinations thereof, are substantially uniformly distributed within the plastic or plastic composite material; and
  one or more skin layers disposed adjacent the at least one core layer, wherein the at least one core layer has a greater thickness than the one or more skin layers and the one or more skin layers comprise a polycarbonate material.

44. The substrate of claim 43, wherein the plastic or plastic composite material exhibits a modulus in the range of about 350 to about 3,000 kpsi.

45. The substrate of claim 43, wherein the reinforcing agents further comprise materials selected from the group consisting of carbon fibers, glass fibers, and combinations thereof.

46. The substrate of claim 43, wherein the damping agents, reinforcing agents, or combinations thereof in the plastic or plastic composite material have a concentration in the range of about 5 to about 65 weight %.

47. The substrate of claim 43, where the at least one core layer comprises one or more sublayers, wherein each sub-layer comprises a different plastic or plastic composite material, different damping agents, different reinforcing agents, or combinations thereof.

48. The substrate of claim 43, wherein said substrate is formatted with servo control patterns.

49. The substrate of claim 43, further comprising:
  a magneto-optical or magnetic recording layer structure disposed on the at least one core layer or one or more skin layers; and
  a carbon overcoat formed atop said magneto-optical or magnetic recording layer structure.

50. The substrate of claim 49, wherein the substrate is disposed in a data storage system comprising:
  a read/write head;
  an actuator for moving said read/write head; and
  a motor for rotating said disk.

51. The substrate of claim 43, wherein the plastic or plastic composite material is selected from the group consisting of polysulfone (PSU), polyethersulfone (PES), polyetherimide (PEI), polyphenylsulfide (PPS), polyphthalamide (PPA), liquid crystal polymer (LCP), polyetheretherketone (PEEK), polycarbonate (PCB) and combinations thereof.

* * * * *